June 14, 1966   H. GILMAN ETAL   3,256,355
PROCESS FOR PREPARING STYRENE AND RECOVERY
OF ETHYLBENZENE
Filed March 24, 1965   2 Sheets-Sheet 1

INVENTORS
HAROLD GILMAN
JOEL J. KIRMAN

BY Bert J Lewen
ATTORNEY

United States Patent Office

3,256,355
Patented June 14, 1966

3,256,355
PROCESS FOR PREPARING STYRENE AND
RECOVERY OF ETHYLBENZENE
Harold Gilman, Jackson Heights, and Joel J. Kirman, Bronx, N.Y., assignors to Halcon International, Inc., a corporation of Delaware
Filed Mar. 24, 1965, Ser. No. 442,369
13 Claims. (Cl. 260—669)

The present application is a continuation-in-part of our copending patent application Serial Number 198,254, filed May 28, 1962, now abandoned.

This invention relates to the preparation of alkenyl aromatics from alkyl aromatics by dehydrogenation. More specifically, the instant invention relates to the dehydrogenation of ethyl benzene in the presence of steam to form styrene and a unique procedure for achieving outstanding heat economy, in the separation of the styrene from the reaction product.

It is well known that styrene can be produced from ethyl benzene at temperatures between about 1100 to 1200° F. by vapor phase catalytic dehydrogenation in the presence of steam. This process is outlined in Groggins, "Unit Processes in Organic Synthesis," McGraw-Hill Book Co., Inc., New York, 5th ed., 1958, pages 537–538. Large quantities of steam are employed in order to supply a part of the sensible heat to the endothermic reaction, to reduce the partial pressure of the ethyl benzene to favor the dehydrogenation reaction, and to keep the catalyst free of coke and carbon deposits. Further, in order to maintain a low partial pressure of ethyl benzene in the reaction mixture using economically feasible quantities of steam, the total pressure of the process stream must be low, preferably 5 to 10 p.s.i.g. or lower.

The effluent from the reactor may be first cooled to a temperature above its dew point by, for example, indirect heat exchange with the reactor feed or direct contact with cold water streams.

Remaining in the cooled gaseous effluent, mainly in the latent heat of condensation of the contained steam, is a great reservoir of heat. Obviously, it is desirable to recover and to effectively utilize this heat in the process. The unit operations in the overall process which require the addition of heat are the fractionation of the unreacted ethyl benzene and dealkylated by-products from the styrene produced. Desirably, the fractionation of ethyl benzene from styrene is performed in a single vacuum column to minimize the plant cost. Single column separation, however, for reasons to be set forth subsequently, must be performed while allowing the styrene bottoms temperature to reach at least 195° F. but not appreciably above 235° F. Temperature within this range usually cannot be achieved by heat transfer with the cooled dehydrogenation reactor effluent as a source of heat for the vacuum column, because the condensation temperature of the steam contained in the reactor effluent, i.e., the temperature range over which the steam gives up its latent heat, is usually not sufficiently high under those pressures which are desirable for the dehydrogenation reaction.

One solution considered, to permit the utilization of the latent heat of condensation of the effluent, is to reduce the column operating temperature by reducing the bottoms operating pressure. However, the column overhead pressures must not fall below 10 to 20 mm. Hg abs. for a feasible operation as understood by those familiar with the art. Furthermore, in order to obtain a sharp separation of the styrene and ethyl benzene, to minimize the recycle of styrene to the dehydrogenation reactor, and to produce as pure a styrene as possible, the column must contain numerous plates (about 60 to 80) each of which adds to the pressure drop through the column. Therefore, lower pressures, e.g., 140 to 150 mm. Hg abs., in the column bottoms corresponding to temperatures significantly lower than 210° F. cannot be achieved in the bottoms of a single ethyl benzene-styrene reaction column.

The upper limit of column operation temperature, i.e., about 235° F., is governed by the tendency of styrene to polymerize; at higher temperatures excessive polymerization results, even in the presence of inhibitors such as sulfur.

In accordance with this invention it has been found that the latent heat in the reactor effluent can be successfully employed to heat the single ethyl benzene vacuum column reboiler by compressing the effluent so that the steam condenses at a minimum temperature of from about 210 to 240° F., preferably from 215 to 230° F., or more specifically, at a temperature of at least 5° F., preferably 10° F., higher than the desired column bottoms temperature.

The heat may be transferred from the reactor effluent by either introducing it directly into the reboilers or by using it to form steam which is thereafter introduced into the reboilers.

In a preferred embodiment of the invention, high pressure steam is used to drive the compressor for the reactor effluent. The expanded steam is then superheated to reaction temperatures and introduced into the dehydrogenation reactor along with feed ethyl benzene. Thus the energy required for compression is readily and inexpensively obtained and integrated with the overall processing scheme.

While in the broadest aspect of the invention any type of gas compression means may be employed, it is clear that, in the preferred case, additional advantages are obtained by using a steam-turbine activated compressor.

Figure 1:
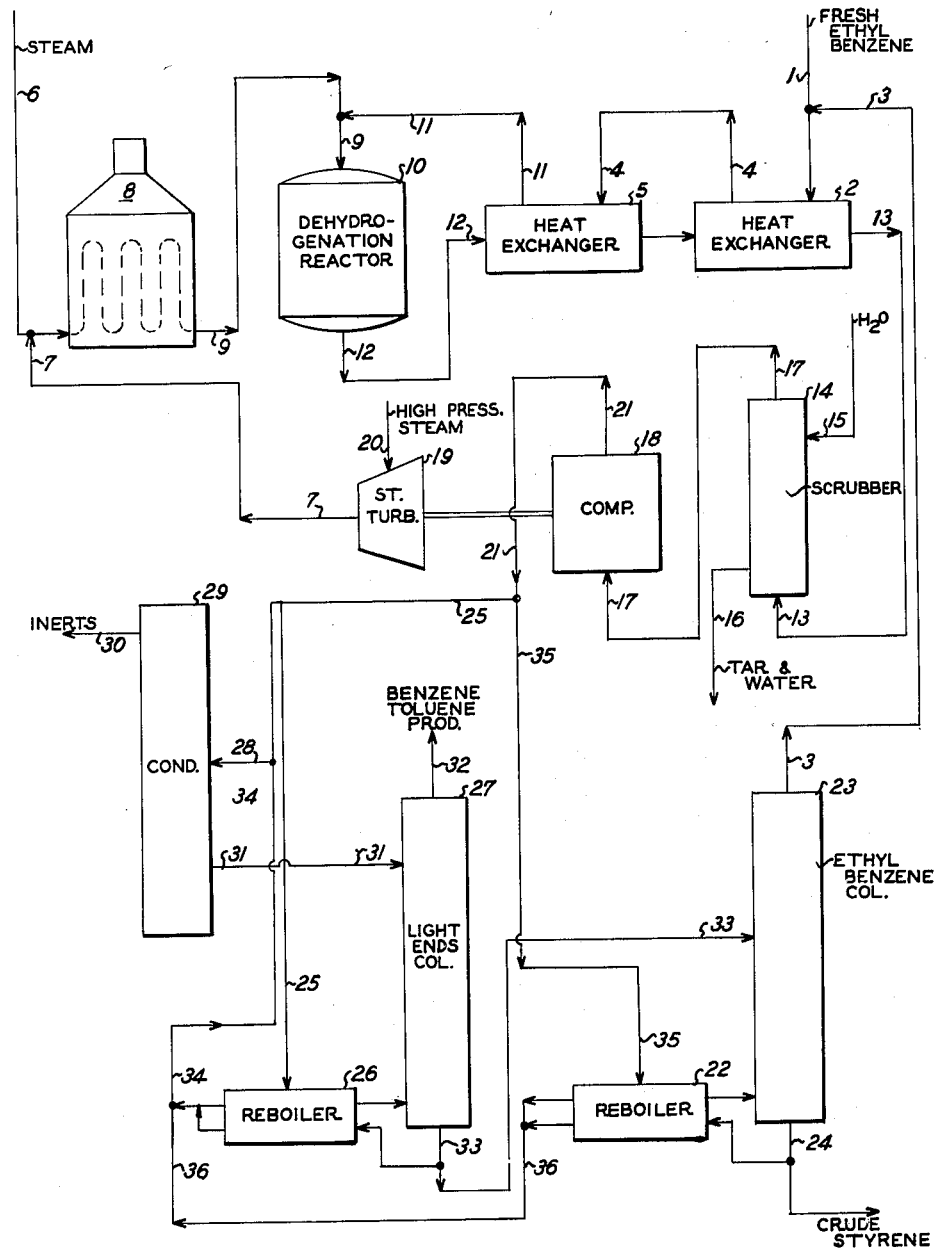
FIGURE 1 illustrates a first embodiment of the invention wherein the compressed reactor effluent is introduced directly into the reboiler.

Turning to FIGURE 1 fresh ethyl benzene, introduced through line 1, is mixed with recycle ethyl benzene from line 3 and passed into heat exchanger 2, wherein it is vaporized. The vaporized ethyl benzene passes via line 4 to heat exchanger 5 wherein the vapors are superheated. Steam, at a pressure conveniently above reaction pressures, enters the process via line 6, is mixed with exhausted steam from line 7, and is superheated in heater 8 to a temperature of about 1200° F. The superheated steam passes through line 9 into reactor 10 after mixing with the superheated stream from line 11. In reactor 10 the ethyl benzene is denhydrogenated to form styrene in contact with a catalyst such as iron oxide at a temperature of about 600° C., an inlet pressure of about 30 p.s.i.g., and at a steam to ethyl benzene weight ratio of about 2.5 to 1. About 40% of the ethyl benzene is converted to styrene. The reactor effluent leaves the reactor 10 through line 12 and contains predominantly unreacted ethyl benzene, steam and styrene; plus lesser amounts of benzene, toluene and heavy tars. This effluent, at a temperature of about 570° C., passes through heat exchangers 5 and 2 wherein it gives up much of its sensible heat to the incoming ethyl benzene. The cooled reactant effluent, now at a temperature of about 250° C., passes to scrubber 14 via line 13. In scrubber 14, the cooled effluent is contacted with a water stream in order to disentrain any tars which may have been carried over from the reactor. The wash water is introduced into the scrubber 14 via line 15 and leaves via line 16 containing a substantial portion of the tars. The scrubber effluent exits via line 17 and passes to compressor 18 wherein the pressure is increased from 20 to 25 p.s.i.a. At this pressure the steam in the effluent condenses down to a temperature of about 220° F., before hydrocarbon begins to condense. Hydrocarbon condensation is preferably avoided because a two phase liquid system interferes with reboiler operation. The compressor 18 is powered by steam turbine 19 which is driven by high pressure steam introduced via line 20. This steam, after giving up a portion of the energy to drive the turbine, is recycled via line 7, and mixed with additional steam introduced through line 6. The combined steam is superheated in steam superheater 8, leaves via line 9, is mixed with ethyl benzene from line 11, and is introduced into the reactor 10. The compressed reactor effluent 21 is divided into three streams. Two of the streams, comprising about 90% of the effluent, serves to provide heat for the light ends column 27 and the ethyl benzene vacuum column 23. A third stream, whose heat is not required for reboiling in reboilers 22 and 26, is passed via line 28 directly to the condenser. Noncondensables are removed from the process through line 30. The condensed reactor effluent passes via line 31 to the light ends column 27 wherein a benzene toluene overhead product is removed via line 32 and the bottoms removed via line 33 and passed to the ethyl benzene column 23. Heat is supplied to the light ends column by a 20 percent portion of the compressed reactor effluent passed via line 25 to light ends reboiler 26. Vapor and liquid streams are removed from the reboiler 26, combined, and passed to condenser 29 via line 34. In the ethyl benzene column 23, ethyl benzene is withdrawn overhead at a pressure of about 25 mm. Hg via line 3 and recycled. This column employs 75 plates and is maintained at a bottoms temperature of 210° F. The crude styrene is removed via line 24 and subjected to further refining processes (not shown). The heat in the ethyl benzene column is supplied by about 70% the compressed reactor effluent which passes via line 35 to the ethyl benzene reboiler 22. Vapor and liquid portions are removed from the reboiler, combined, and passed to the condenser 29 via line 36 and line 34.

Figure 2:
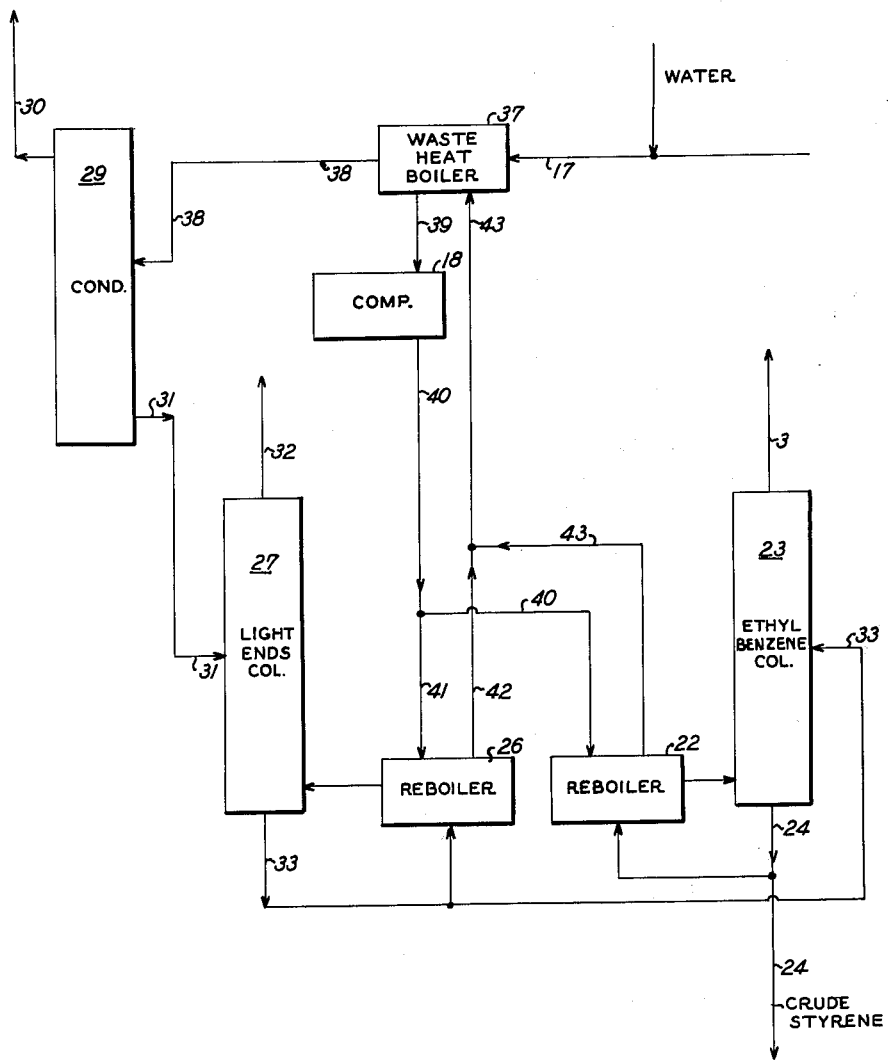
FIGURE 2 illustrates a further embodiment of the invention wherein the reactor effluent is used to form steam which is compressed and introduced into the reboiler.

As shown on FIGURE 2, the stream 17, removed from the scrubber, is admixed with liquid water to reduce its temperature to just above the dew point, about 220° F. The mixture then enters the tube side of waste heat boiler 37 where only the water is permitted to condense by indirect contact with water entering shell side through line 23. The partially condensed effluent leaves the waste heat boiler 37 via line 38 and passes to condenser 29 at a temperature of about 204° F. The steam is generated in the waste heat boiler 27 at a pressure slightly less than atmospheric and leaves via line 29 at a temperature of about 203° F. The low pressure steam is then compressed to about 10 p.s.i.g. in compressor 18 and thereafter passed to reboilers 26 and 22 via lines 40 and 41 respectively. The condensed steam may be recycled from the back to the waste heat boiler via lines 42 and 43. The remainder of the column operates in substantially the same manner as described in FIGURE 1.

In the conventional dehydrogenation process the reactor effluent is at a pressure of from 10 p.s.i.a. to 25 p.s.i.a., preferably from 20 to 25 p.s.i.a. This pressure is less than the reactor pressure because of the pressure drop through the system. The effluent, in accordance with this invention, is then compressed so that the final portions of the steam in the effluent condense at a temperature of from 210 to 240° F., preferably, from 215 to 230° F. These ranges of condensation temperature apply to pressures of from about 20 p.s.i.a. to 32 p.s.i.a, and preferably, from 22 to 28 p.s.i.a., respectively. However, since the composition of the effluent effects the condensation temperature of the steam these pressures are subject to some variation. One skilled in the art can readily determine the degree of compression necessary to achieve an appropriate condensation temperature for a particular effluent composition, the condensation temperature being the controlling criterion herein. Preferably, the effluent is compressed so as to increase its pressure at least 2 p.s.i.a. and most desirably 5 to 10 p.s.i.a., although in certain circumstances even lower degrees of compression may be advantageous. For example, where high dehydrogenation pressures are employed only slight degrees of compression may be necessary to achieve the appropriate condensation temperature.

The compressed effluent is introduced into the reboiler of the ethyl benzene column as illustrated in the figure. It is desired to maintain this column bottoms at a temperature of from 200 to 235° F. and preferably from 205° F. to 220° F. to achieve satisfactory separation without excessive styrene polymerization.

At least 10% of the reactor effluent is compressed and introduced into the reboiler of ethyl benzene column, generally not more than 90% and preferably from 55% to 85%. The remaining portion of the reactor effluent may be conveniently utilized to supply heat to the reboiler of the light ends distillation column or other columns in the system. On the other hand, if the heat supply in the reactor effluent is inadequate, it is understood that additional heat may be supplied from an extraneous source, such as by additional steam in other reboilers.

While the term "single vacuum column" is used to refer to the ethyl benzene column, two or more columns in parallel may be used. This term is intended only to distinguish from a process wherein the ethyl benzene is separated in two or more columns operating in series.

The dehydrogenation can be carried out in a temperature of 500° C. to 750° C. using a steam ratio of from about 1 to 10 lbs. of steam per lb. of ethyl benzene. The dehydrogenation catalysts may be iron, chromium, manganese or zinc oxide supported on activated charcoal, alumina or bauxite or other catalysts which are well-known in the art.

It will be understood that modifications and variations may be effected without departing from the spirit of the invention.

We claim:

1. A process for the separation of unreacted ethyl benzene from a gaseous stream containing dehydrogenation products thereof and steam which comprises: compressing at least a portion of said stream so that the minimum condensation temperature of said stream is from 210 to 240° F., passing the resultant compressed stream to the reboiler of an ethyl benzene distillation zone; condensing the steam in said stream and thereby providing heat for distillation; and recovering ethyl benzene and other by-products as distillates.

2. A process for the separation of unreacted ethyl benzene from a gaseous stream containing dehydrogenation products thereof and steam which comprises: compressing at least a portion of said stream to increase the pressure thereof at least 2 p.s.i. so that the minimum condensation temperature of said stream is from 210 to 240° F., passing the resultant compressed stream to the reboiler of an ethyl benzene distillation zone, condensing said steam so as to maintain a bottoms temperature in said ethyl benzene distillation zone of from about 200 to 235° F.; and recovering ethyl benzene as a distillate.

3. The process of claim 2 wherein the pressure of said gaseous stream is increased from about 5 to 10 p.s.i.

4. In a process for the preparation of styrene from ethyl benzene wherein the ethyl benzene is catalytically dehydrogenated in the presence of steam so as to form a reactor effluent comprising unreacted ethyl benzene, dehydrogenation products thereof and steam, the improvement which comprises: compressing at least a portion of said reactor effluent so that the minimum condensation temperature of said steam is from 210 to 240° F., passing the resultant compressed stream to a reboiler of an ethyl benzene distillation zone; condensing the steam of said stream, thereby maintaining the temperature of the bottoms between a temperature of about 195 to 235° F.; recovering ethyl benzene as a distillate; and recycling said ethyl benzene to said dehydrogenation step.

5. In the process of claim 4 wherein at least 10% by weight of the reactor effluent is compressed and introduced into the reboiler of said ethyl benzene column.

6. In the process of claim 4 wherein from 55 to 85% of said reactor effluent is compressed and passed to said ethyl benzene column.

7. In the process of claim 4 wherein said ethyl benzene distillation zone consists of a single vacuum having from 60 to 80 plates.

8. A process for the preparation of styrene from ethyl benzene which comprises: introducing steam at a relatively high pressure into a steam turbine; thereby actuating said turbine; withdrawing steam at a reduced pressure from said steam turbine; superheating said steam, introducing said reduced pressure and superheated steam and ethyl benzene into a catalytic dehydrogenation zone; withdrawing a reactor effluent containing styrene, ethyl benzene and steam; passing at least a portion of said reaction effluent to a compressor; actuating said compressor by means of said steam turbine; withdrawing from said compressor a compressed reactor effluent; passing at least a portion of said compressed reactor effluent to the reboiler of an ethyl benzene distillation zone, so as to provide heat for the distillation; and recovering ethyl benzene as a distillate and crude styrene as a bottoms product.

9. A process for the separation of unreacted ethyl benzene from a gaseous stream containing dehydrogenation products thereof and steam which comprises: passing said stream to a heat exchange zone; condensing the steam in said stream and generating steam in said heat exchange zone; compressing said generated steam so that the minimum condensation temperature of said stream is from 210 to 240° F., passing the resultant compressed generated steam to the reboiler of an ethyl benzene distillation zone; condensing the steam and thereby providing heat for distillation; and recovering ethyl benzene and other by-products as distillates.

10. A process for the separtion of unreacted ethyl benzene from a gaseous stream containing dehydrogenation products thereof and steam which comprises: passing said stream to a heat exchange zone; condensing the steam in said stream and generating steam in said heat exchange zone; compressing generated steam to increase the pressure thereof at least 2 p.s.i. so that the minimum condensation temperature of said stream is from 210 to 240° F., passing the resultant compressed generated steam to the reboiler of an ethyl benzene distillation zone, condensing said steam so as to maintain a bottoms temperature in said ethyl benzene distillation zone of from about 200 to 235° F.; and recovering ethyl benzene as a distillate.

11. The process of claim 10 wherein the pressure of said generated steam is increased from about 5 to 10 p.s.i.

12. In a process for the preparation of styrene from ethyl benzene wherein the ethyl benzene is catalytically dehydrogenated in the presence of steam so as to form a reactor effluent comprising unreacted ethyl benzene, dehydrogenation products thereof and steam, the improvement which comprises: passing said stream to a heat exchange zone; condensing the steam in said stream and generating steam in said heat exchange zone; compressing said generated steam so that the minimum condensation temperature of said steam is from 210 to 240° F., passing the resultant generated steam to a reboiler of an ethyl benzene distillation zone; condensing the steam, thereby maintaining the temperature of the bottoms between a temperature of about 195 to 235° F.; recovering ethyl benzene as a distillate; and recycling said ethyl benzene to said dehydrogenation step.

13. In the process of claim 12 wherein said ethyl benzene distillation zone consists of a single vacuum column having from 60 to 80 plates.

References Cited by the Examiner

UNITED STATES PATENTS 2,959,626   11/1960   Krausse et al. _____ 260—669

FOREIGN PATENTS 797,045   6/1958   Great Britain.

DELBERT E. GANTZ, *Primary Examiner.*

PAUL M. COUGHLAN, C. R. DAVIS, *Examiners.*